(12) United States Patent
Lauridsen et al.

(10) Patent No.: US 12,119,849 B2
(45) Date of Patent: Oct. 15, 2024

(54) TIMING-BASED USER EQUIPMENT MOBILITY FOR TRANSPARENT SATELLITES

(71) Applicant: Nokia Technologies Oy, Espoo (FI)

(72) Inventors: Mads Lauridsen, Gistrup (DK); Jeroen Wigard, Klarup (DK); Rafhael Amorim, Aalborg (DK); István Z. Kovacs, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 355 days.

(21) Appl. No.: 17/607,772

(22) PCT Filed: May 1, 2020

(86) PCT No.: PCT/US2020/031160
§ 371 (c)(1),
(2) Date: Oct. 29, 2021

(87) PCT Pub. No.: WO2020/223694
PCT Pub. Date: Nov. 5, 2020

(65) Prior Publication Data
US 2022/0217608 A1    Jul. 7, 2022

Related U.S. Application Data

(60) Provisional application No. 62/842,334, filed on May 2, 2019.

(51) Int. Cl.
*H04B 7/185* (2006.01)
*H04W 36/36* (2009.01)
(Continued)

(52) U.S. Cl.
CPC ........ *H04B 7/18508* (2013.01); *H04W 36/36* (2013.01); *H04W 56/0045* (2013.01); *H04W 56/0065* (2013.01)

(58) Field of Classification Search
CPC .................................................. H04B 7/18508
See application file for complete search history.

(56) References Cited

U.S. PATENT DOCUMENTS

2013/0242783 A1    9/2013  Horn et al.
2016/0323800 A1*   11/2016  Ulupinar ............... H04W 36/32
(Continued)

FOREIGN PATENT DOCUMENTS

EP    2391159 A1    11/2011
WO    2015/127987 A1    9/2015
WO    2017/052464 A1    3/2017

OTHER PUBLICATIONS

"3rd Generation Partnership Project; Technical Specification Group Radio Access Network; Solutions for NR to support hon terrestrial networks (NTN) (Release 16)", 3GPP TR 38.821, V0.4.0, Mar. 2019, pp. 1-46.
(Continued)

*Primary Examiner* — San Htun
(74) *Attorney, Agent, or Firm* — Robert P. Michal, Esq.; Carter, DeLuca & Farrell LLP

(57) ABSTRACT

According to certain embodiments, a method and apparatus may include transmitting, by a first network entity, at least one time-based measurement configuration to a user equipment. The method may further include receiving, by the first network entity, at least one measurement result from the user equipment. The method may further include determining, by the first network entity, whether at least one handover should be performed.

1 Claim, 5 Drawing Sheets

(51) Int. Cl.
   *H04W 56/00*   (2009.01)
   *H04W 84/06*   (2009.01)

(56) References Cited

U.S. PATENT DOCUMENTS

2017/0299728 A1* 10/2017 Lie ..................... G01S 19/426
2019/0230568 A1*  7/2019 Arur .................. H04B 7/18541
2021/0029658 A1*  1/2021 Mahalingam ..... H04W 74/0833
2021/0400556 A1* 12/2021 M Ttanen ......... H04W 36/0085

OTHER PUBLICATIONS

"3rd Generation Partnership Project; Technical Specification Group Radio Access Network; NR; Physical layer measurements (Release 15)", 3GPP TS 38.215, V15.4.0, Dec. 2018, pp. 1-15.

International Search Report and Written Opinion received for corresponding Patent Cooperation Treaty Application No. PCT/US2020/031160, dated Sep. 10, 2020, 13 pages.

Office Action received for corresponding European Patent Application No. 20727520.7, dated Jun. 17, 2024, 3 pages.

* cited by examiner

# TIMING-BASED USER EQUIPMENT MOBILITY FOR TRANSPARENT SATELLITES

RELATED APPLICATION

This application was originally filed as PCT Application No. PCT/US2020/031160, filed on 1 May 2020, which claims priority from U.S. Provisional Application No. 62/842,334, filed on 2 May 2019, each of which is incorporated herein by reference in its entirety.

CROSS-REFERENCE TO RELATED APPLICATION

This application claims the benefit of U.S. Provisional Application No. 62/842,334, filed May 2, 2019. The entire content of the above-referenced application is hereby incorporated by reference.

TECHNICAL FIELD

Various communication systems may benefit from improved time-based measurement configurations.

BACKGROUND

3rd Generation Partnership Project (3GPP) new radio (NR) may use non-terrestrial networks to provide services to users in remote and disaster areas, as well as to improve reliability. Low-earth orbit or geostationary earth orbit satellites may provide NR service. For example, a NR base station may be on-board a satellite, referred to as regenerative, or may be terrestrial, referred to as transparent. Specifically, satellites may be equipped with an amplify-and-forward feature, which may receive ground base station signalling from another ground base station, and then forward the signalling to the user equipment on Earth. The satellite-ground station link may defined as a feeder link, fl, while the satellite-user link may be defined as a service link, sl. In some cases, these links may operate on different frequencies, requiring the satellite to perform frequency conversion.

SUMMARY

In accordance with some embodiments, a method may include transmitting, by a first network entity, at least one time-based measurement configuration to a user equipment. The method may further include receiving, by the first network entity, at least one measurement result from the user equipment. The method may further include determining, by the first network entity, whether at least one handover should be performed.

In accordance with certain embodiments, an apparatus may include means for transmitting at least one time-based measurement configuration to a user equipment. The apparatus may further include means for receiving at least one measurement result from the user equipment. The apparatus may further include means for determining whether at least one handover should be performed.

In accordance with various embodiments, an apparatus may include at least one processor and at least one memory including computer program code. The at least one memory and the computer program code can be configured to, with the at least one processor, cause the apparatus to at least transmit at least one time-based measurement configuration to a user equipment. The at least one memory and the computer program code can be further configured to, with the at least one processor, cause the apparatus to at least receive at least one measurement result from the user equipment. The at least one memory and the computer program code can be further configured to, with the at least one processor, cause the apparatus to at least determine whether at least one handover should be performed.

In accordance with some embodiments, a non-transitory computer readable medium can be encoded with instructions that may, when executed in hardware, perform a method. The method may include transmitting at least one time-based measurement configuration to a user equipment. The method may further include receiving at least one measurement result from the user equipment. The method may further include determining whether at least one handover should be performed.

In accordance with certain embodiments, a computer program product may perform a method. The method may include transmitting at least one time-based measurement configuration to a user equipment. The method may further include receiving at least one measurement result from the user equipment. The method may further include determining whether at least one handover should be performed.

In accordance with various embodiments, an apparatus may include circuitry configured to transmit at least one time-based measurement configuration to a user equipment. The circuitry may further be configured to receive at least one measurement result from the user equipment. The circuitry may further be configured to determine whether at least one handover should be performed.

In accordance with some embodiments, a method may include receiving, by a user equipment, at least one time-based measurement configuration. The method may further include performing, by the user equipment, at least one measurement of at least one starting time of at least one system frame number. The method may further include detecting, by the user equipment, at least one trigger event associated with the at least one time-based measurement configuration associated with transmitting at least one measurement result. The method may further include transmitting, by the user equipment, at least one measurement result to a first network entity in response to the at least one detected trigger event. The at least one measurement result may comprise at least a first indication and at least a second indication.

In accordance with certain embodiments, an apparatus may include means for receiving at least one time-based measurement configuration. The apparatus may further include means for performing at least one measurement of at least one starting time of at least one system frame number. The apparatus may further include means for detecting at least one trigger event associated with the at least one time-based measurement configuration associated with transmitting at least one measurement result. The apparatus may further include means for transmitting at least one measurement result to a first network entity in response to the at least one detected trigger event. The at least one measurement result may comprise at least a first indication and at least a second indication.

In accordance with various embodiments, an apparatus may include at least one processor and at least one memory including computer program code. The at least one memory and the computer program code can be configured to, with the at least one processor, cause the apparatus to at least receive at least one time-based measurement configuration. The at least one memory and the computer program code can be further configured to, with the at least one processor, cause the apparatus to at least perform at least one measurement of at least one starting time of at least one system frame number. The at least one memory and the computer program code can be further configured to, with the at least one processor, cause the apparatus to at least detect at least one trigger event associated with the at least one time-based measurement configuration associated with transmitting at least one measurement result. The at least one memory and the computer program code can be further configured to, with the at least one processor, cause the apparatus to at least transmit at least one measurement result to a first network entity in response to the at least one detected trigger event. The at least one measurement result may comprise at least a first indication and at least a second indication.

In accordance with some embodiments, a non-transitory computer readable medium can be encoded with instructions that may, when executed in hardware, perform a method. The method may include receiving at least one time-based measurement configuration. The method may further include performing at least one measurement of at least one starting time of at least one system frame number. The method may further include detecting at least one trigger event associated with the at least one time-based measurement configuration associated with transmitting at least one measurement result. The method may further include transmitting at least one measurement result to a first network entity in response to the at least one detected trigger event. The at least one measurement result may comprise at least a first indication and at least a second indication.

In accordance with certain embodiments, a computer program product may perform a method. The method may include receiving at least one time-based measurement configuration. The method may further include performing at least one measurement of at least one starting time of at least one system frame number. The method may further include detecting at least one trigger event associated with the at least one time-based measurement configuration associated with transmitting at least one measurement result. The method may further include transmitting at least one measurement result to a first network entity in response to the at least one detected trigger event. The at least one measurement result may comprise at least a first indication and at least a second indication.

In accordance with various embodiments, an apparatus may include circuitry configured to receive at least one time-based measurement configuration. The circuitry may further be configured to perform at least one measurement of at least one starting time of at least one system frame number. The circuitry may further be configured to detect at least one trigger event associated with the at least one time-based measurement configuration associated with transmitting at least one measurement result. The circuitry may further be configured to transmit at least one measurement result to a first network entity in response to the at least one detected trigger event. The at least one measurement result may comprise at least a first indication and at least a second indication.

BRIEF DESCRIPTION OF THE DRAWINGS

For proper understanding of this disclosure, reference should be made to the accompanying drawings, wherein.

DETAILED DESCRIPTION

Figure 1:
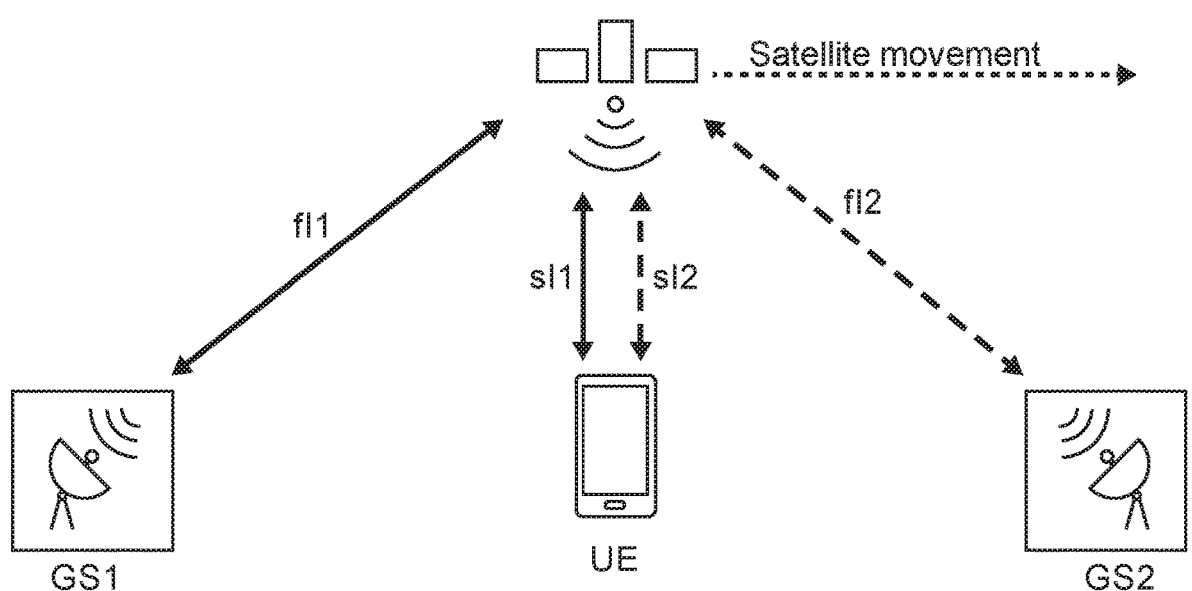
FIG. 1 illustrates an example of feeder and service links between a satellite, user equipment, and base stations according to certain embodiments.

In traditional terrestrial mobility, user equipment may be configured with one or more measurement configurations and related mobility trigger events. These measurements may be based on the reference signal received power (RSRP) and related signal level metrics. However, for a transparent satellite, as illustrated in FIG. 1, the RSRP (and related metrics) of service link 1 and 2, respectively sl1 and sl2, are the same due to the amplify-and-forward function, assuming that the signals are amplified to a configured emitted radiated power. Thus, the UE may not be able to determine that the connection towards ground station 2 (GS2) is improving due to the satellite moving towards GS2. As a result, the UE may not trigger a mobility report towards the serving cell on ground station 1 (GS1).

3GPP technical specification (TS) 38.215 discusses measuring a system frame number (SFN) and SFN frame timing difference (SFTD). The observed SFN and SFTD between an E-UTRA primary cell and an NR PSCell may be based on two components. First, an SFN offset=$(SFN_{PCell} - SFN_{PSCell})$ mod 1024, where $SFN_{PCell}$ is the SFN of a E-UTRA PCell radio frame, and $SFN_{PSCell}$ is the SFN of the NR PSCell radio frame of which the UE receives the start closest in time to the time when it receives the start of the PCell radio frame. Second, a frame boundary offset= $[(T_{FrameBoundaryPCell} - T_{FrameBoundaryPSCell})/5]$, where $T_{FrameBoundaryPCell}$ is the time when the UE receives the start of a radio frame from the PCell, and $T_{FrameBoundaryPSCell}$ is the time when the UE receives the start of the radio frame from the PSCell that is closest in time to the radio frame received from the PCell. The unit of $(T_{FrameBoundaryPCell} - T_{FrameBoundaryPSCell})$ may be $T_s$. However, the SFTD may only be defined as a timing difference between LTE and NR, and further may only be defined for dual connectivity. In addition, the observed time difference of arrival (OTDOA) has been standardized for LTE for positioning, and relies on base stations transmitting positioning reference signals, which the UE may use to measure and identify differences.

Certain embodiments described herein relate to UE mobility affected by changes in feeder links. Specifically, the signal power of service links between a transparent satellite and a UE on Earth, such as $sl_1$ and $sl_2$, may be the same for both the serving and target cell despite using different feeder links. Thus, certain embodiments described herein may use UE time measurements between the two cells. Certain embodiments described herein may have various benefits and/or advantages to overcome the disadvantages described above. For example, certain embodiments may evenly distribute a signaling load, not only for measurement reports but also for handover commands. A transparent satellite may possess limited processing capabilities since it only performs an amplify-and-forward operation. Thus, when a new base station connects to the satellite through a new feeder link, the system is unaware of whether the UE shall perform a handover.

Figure 2:
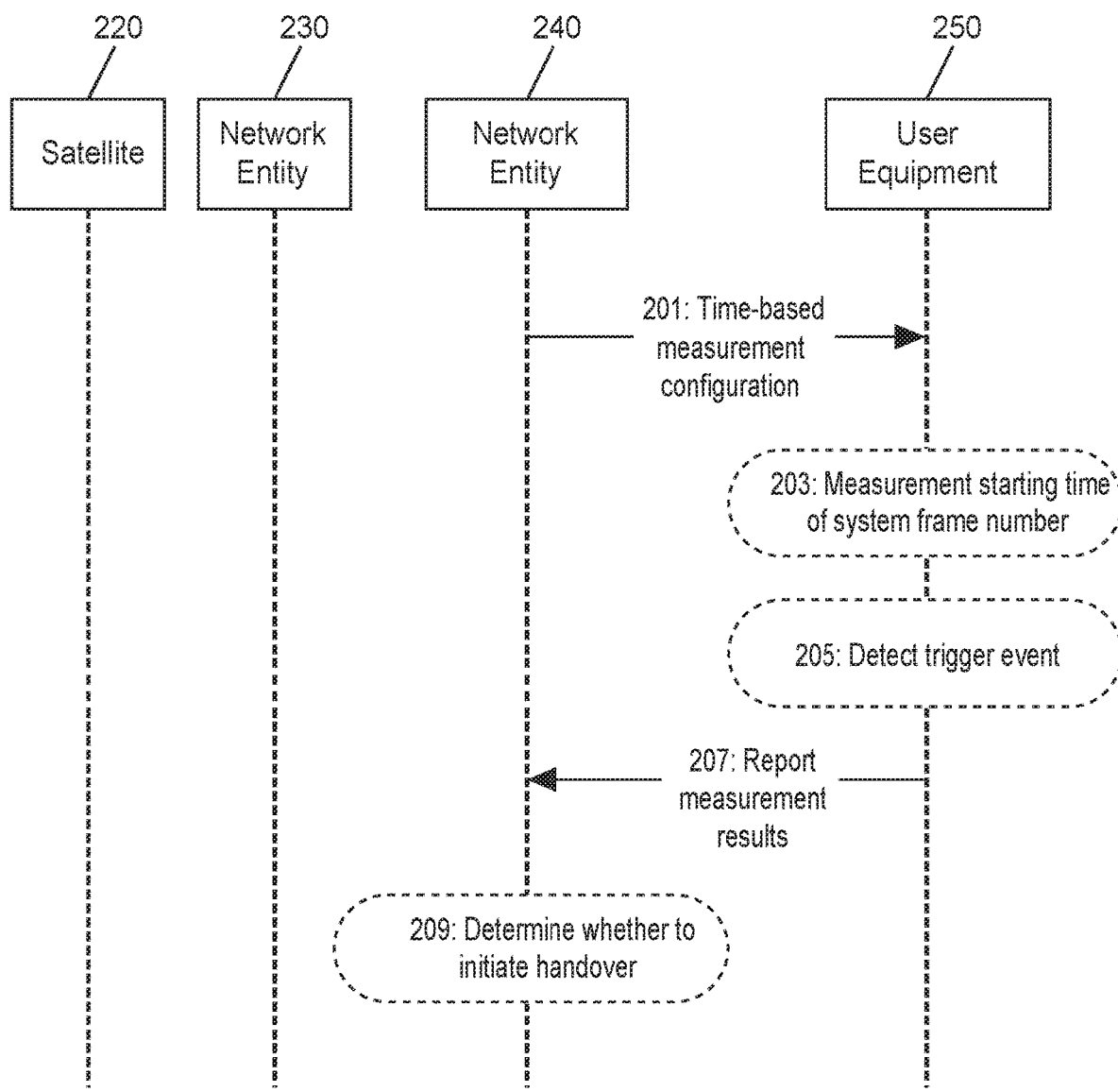
FIG. 2 illustrates an example of a signal flow diagram according to certain embodiments.

FIG. 2 illustrates an example of a system according to certain embodiments. A system may include at least one or more satellite 220, at least one NE, such as NE 230 and NE 240, and at least one UE 250.

In step 201, UE 250 may receive at least one time-based measurement configuration from NE 240. The at least one time-based measurement configuration may be based on time rather than signal power levels. As discussed above, propagation delay and loss may be equal for $sl_1$ and $sl_2$, as shown in FIG. 1. The transparent satellite amplify-and-forward functionality may cause UE 250 to be unaware of the propagation loss on $fl_1$ and $fl_2$, but may be affected by the propagation delay of $fl_1$ and $fl_2$. The at least one time-based measurement configuration may be based on at least one system time received from NE 230 and/or NE 240, which may be physically separated. In some embodiments, the at least one time-based measurement configuration may comprise at least one offset value, such as $t_{SFN-Offset}$.

In certain embodiments, the at least one time-based measurement configuration may be configured to configure UE 250 to measure, based on the received at least one time-based measurement configuration, at least one absolute starting time of at least one given system frame number associated with NE 240 as observed by UE 250, which may be denoted as $t_{SFN-gNB,1}$, and/or at least one absolute starting time of at least one given system frame number associated with NE 230 as observed by UE 250, which may be denoted as $t_{SFN-gNB,2}$.

In various embodiments, the at least one time-based measurement configuration may be configured to configure UE 250 to measure at least one timing advance towards at least one connection associated with NE 240 and/or at least one connection associated with NE 230.

In some embodiments, the at least one time-based measurement configuration may be configured to configure UE 250 to perform at least one timing measurement associated with the coordinated universal time (UTC) time information of at least one system information block 9 (SIB9) associated with NE 240 and/or NE 250.

In step 203, UE 250 may perform at least one measurement of at least one starting time of at least one SFN. In certain embodiments, NE 230 and NE 240 may be time-synchronized. As a result, UE 250 may determine at least one timing difference by comparing the known timing of NE 230 and measurements of the synchronization signal block (SSB) of NE 240. For example, the SSB may contain the primary SS and secondary SS, enabling UE 250 to determine time-frequency synchronization, and/or at least one physical broadcast channel (PBC), which may comprise at least one master information block (MIB) containing at least one SFN. In some embodiments, UE 250 may measure the absolute starting time of a given SFN for NE 230 and NE 240, indicated as $t_{SFN-UE,1}$ and $t_{SFN-UE,2}$, respectively. For example, the corresponding values of $t_{SFN}$ may be received from NE 230 and NE 240, according to:

$$t_{SFN-gNB,1} = t_{SFN-gNB,2},$$

where $t_{SFN-gNB,1}$ and $t_{SFN-gNB,2}$ are the absolute time of transmission of a given SFN from NE 230 and NE 240, respectively. In some embodiments, the difference between $t_{SFN-gNB,1}$ and $t_{SFN-gNB,2}$ may be $t_{SFN-Offset}$. Furthermore, in various embodiments, where $t_{SFN-Offset}=0$, NE 230 and NE 240 may be synchronized. However, where $t_{SFN-Offset} \neq 0$, NE 230 and NE 240 may not be synchronized.

Due to the propagation delays, the SFN may be received at different times by UE 250, according to:

$$t_{SFN-UE,1} = t_{SFN-gNB,1} + t_{sl1} + t_{fl,1}, \text{ and}$$

$$t_{SFN-UE,2} = t_{SFN-gNB,2} + t_{sl2} + t_{fl,2},$$

where $t_{sl}$ and $t_{fl}$ are service and feeder link delays, respectively.

In some embodiments, the SFN from NE 230 and NE 240 may not be equal, but the offset may be known to the network, and may be signalled as part of the measurement configuration and/or may be determined by UE 250 associated with the measurements.

In certain embodiments, for a transparent satellite, service links may experience the same delay. However, feeder links may not experience the same delay because the satellite may be closer to one network entity than the other, and thus a shorter propagation distance and shorter delay.

In some embodiments, NE 230 and NE 240 may not be time-synchronized. When not time-synchronized, there may be a constant offset between any two pairs of satellites. The offset may be estimated by NE 230, NE 240, and/or UE 250, and/or may be used to calculate at least one timing value.

In step 205, at least one trigger event may be detected by UE 250. In step 207, UE 250 may transmit at least one measurement result to NE 240. The at least one measurement result may comprise at least one measurement event based on the two different times $t_{SFN-UE,1}$ and $t_{SFN-UE,2}$. For example, at least one measurement result may be reported to NE 240 when the frame time difference (FTD) is larger than a predetermined threshold value $\Delta t$, which may be calculated by:

$$FTD = t_{SFN-UE,1} - t_{SFN-UE,2} + t_{SFN-Offset} > \Delta t.$$

The at least one measurement result may include at least $t_{SFN-UE,1}$ and $t_{SFN-UE,2}$.

In some embodiments, $\Delta t$ may be used as a hysteresis parameter similar to traditional measurement events using signal power levels. Alternatively, $\Delta t$ may be used as a window applied by NE 240 to control when other UE may trigger a measurement report, which may be used to trigger a handover in step 207.

In certain embodiments, UE 250 may randomly select $\Delta t$, for example, a uniform or Gaussian distribution of [0–T]. As a result, UE 250 under the satellite coverage of SA 220 may trigger at least one event during at least one different point in time, including where at least one propagation delay measurement is the same.

In various embodiments, UE 250 may be configured for dual connectivity (DC). DC may enable UE 250 to be connected to NE 230 and NE 240 simultaneously, and may measure at least one timing advance (TA) towards NE 230 and/or NE 240.

In certain embodiments, at least one measurement event may be based on at least one TA timing difference (TATD), calculated as:

$$TATD = TA_{gNB1} - TA_{gNB2} > \Delta T,$$

where $TA_{gNB1}$ and $TA_{gNB2}$ are currently applied TA levels towards NE 230 and NE 240, respectively. Furthermore, the at least one TA may include at least one $s_l$ and/or at least one $f_l$ delay. Additionally or alternatively, at least one offset factor $\Delta T$ may be used to account for a delay offset when NE 230 and NE 240 are not synchronized. Furthermore, $\Delta T$ may be specific to NE 230 and NE 240, and may not be specific to UE 250.

In some embodiments, NE 230 and NE 240 may exchange at least one of $TA_{gNB1}$ and $TA_{gNB2}$ over an $X_n$ interface. The exchange of the at least one current TA level may enable the network to determine when to perform at least one handover without obtaining measurements from UE 250.

In some embodiments, at least one timing reference may be used for the at least one measurement, and may be obtained from other system information than the reception of the SFN in the broadcast channel. For example, in 5G NR, at least one SIB9 message may comprise at least one absolute time reference, and may be used to estimate PHY latency between NE 230 and NE 240.

In step 209, NE 240 may determine whether at least one handover should be performed. In some embodiments, at least one source timing may exceed a first threshold and/or at least one timing from NE 230 may be less than a second threshold, specifically:

$t_{SFN-UE,1}$>threshold1

$t_{SFN-UE,2}$<threshold2.

Figure 3:
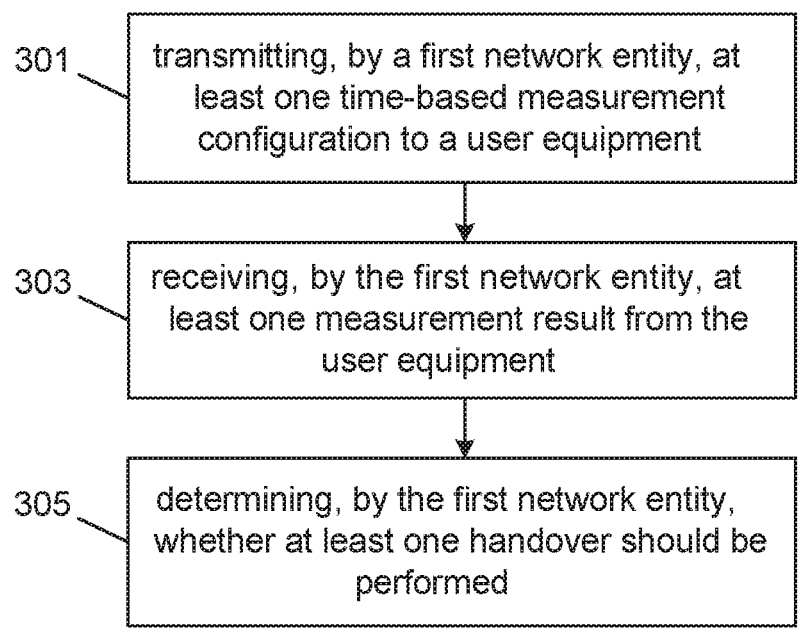
FIG. 3 illustrates an example of a method performed by a network entity according to certain embodiments.
Figure 5:
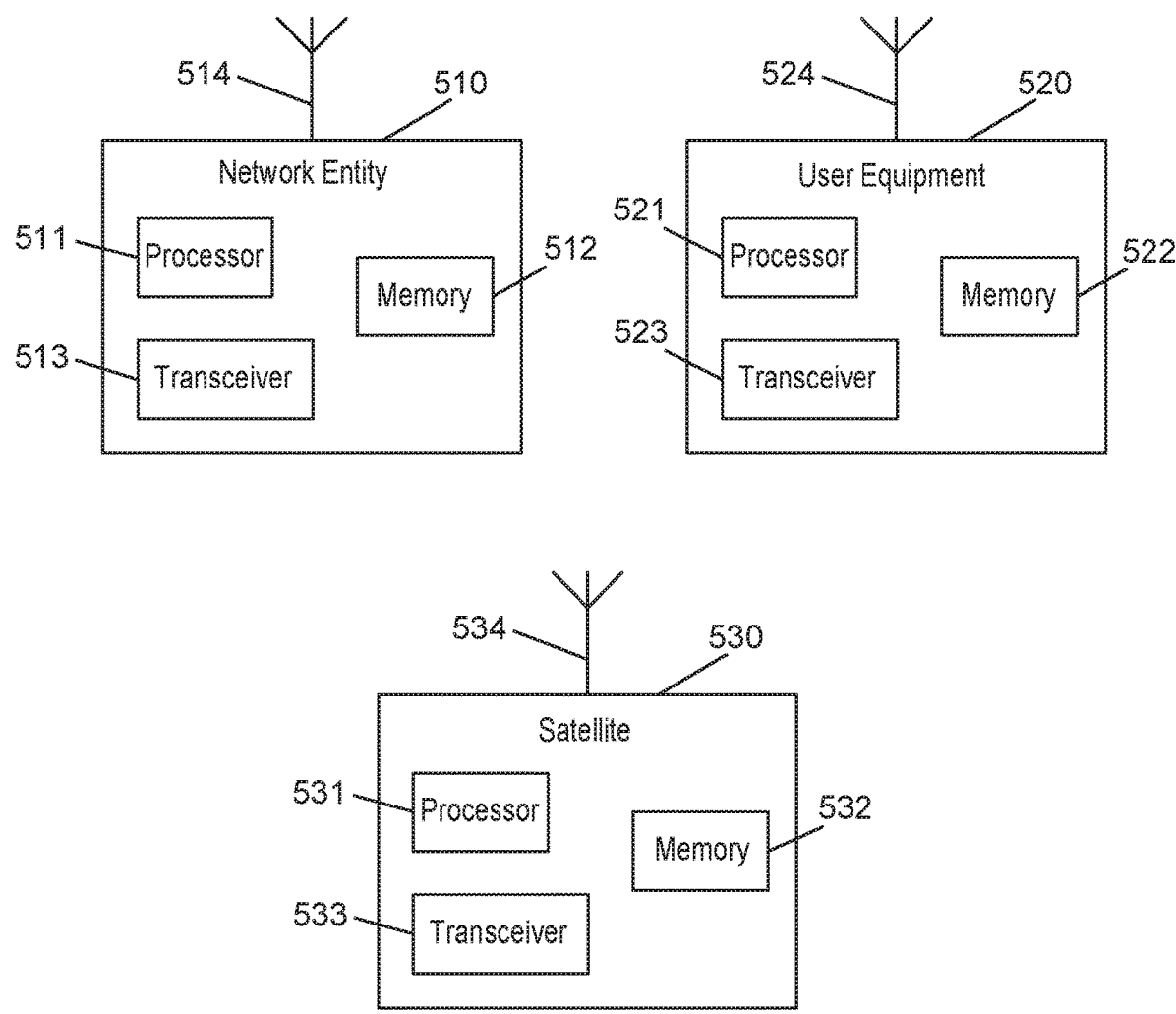
FIG. 5 illustrates an example of a system architecture according to certain embodiments.

FIG. 3 illustrates an example of a method performed by a first NE, such as NE 510 illustrated in FIG. 5, according to certain embodiments. In step 301, the first NE may transmit at least one time-based measurement configuration to a user equipment, such as UE 520 in FIG. 5. In a variant, the at least one time-based measurement configuration may be configured to configure the user equipment to measure at least one absolute starting time of at least one given system frame number associated with the first NE as observed by the user equipment, which may be denoted as $t_{SFN-gNB,1}$, and/or at least one absolute starting time of at least one given system frame number associated with a second NE as observed by the user equipment, which may be denoted as $t_{SFN-gNB,2}$.

In a variant, the at least one time-based measurement configuration may be configured to configure the user equipment to measure at least one timing advance towards at least one connection associated with the first network entity and/or at least one connection associated with a second network entity.

In a variant, the at least one time-based measurement configuration may be configured to configure the user equipment to perform at least one timing measurement associated with the coordinated universal time (UTC) time information of at least one system information block 9 (SIB9) associated with the first network entity and/or a second network entity.

In step 303, the NE may receive at least one measurement result from the UE. The at least one measurement result may comprise at least one measurement event based on two different times $t_{SFN-UE,1}$ and $t_{SFN-UE,2}$. For example, at least one measurement result may be received by the first NE when a FTD is larger than a predetermined threshold value $\Delta t$, calculated by:

$$FTD = t_{SFN-UE,1} - t_{SFN-UE,2} + t_{SFN-Offset} > \Delta t.$$

The at least one measurement result may include at least $t_{SFN-UE,1}$ and $t_{SFN-UE,2}$.

In some embodiments, $\Delta t$ may be used as a hysteresis parameter similar to traditional measurement events using signal power levels. Alternatively, $\Delta t$ may be used as a window applied by the NE to control when other UE may trigger a measurement report, which may be used to trigger a handover.

In some embodiments, the NE and a second NE, such as NE 510 in FIG. 5, may exchange at least one of $TA_{gNB1}$ and $TA_{gNB2}$ over an $X_n$ interface. The exchange of the at least one current TA level may enable the network to determine when to perform at least one handover without obtaining measurements from the NE. Furthermore, the NE and the second NE may be physically separated.

In some embodiments, at least one timing reference may be used for the at least one measurement, and may be obtained from other system information than the reception of the SFN in the broadcast channel. For example, in 5G NR, at least one SIB9 message may comprise at least one absolute time reference, and may be used to estimate PHY latency between the NE and the second NE.

In step 305, the NE may determine whether at least one handover should be performed. In some embodiments, at least one source timing may exceed a first threshold and/or at least one timing from the second NE may be less than a second threshold, specifically:

$t_{SFN-UE,1}$>threshold1

$t_{SFN-UE,2}$<threshold2.

Figure 4:
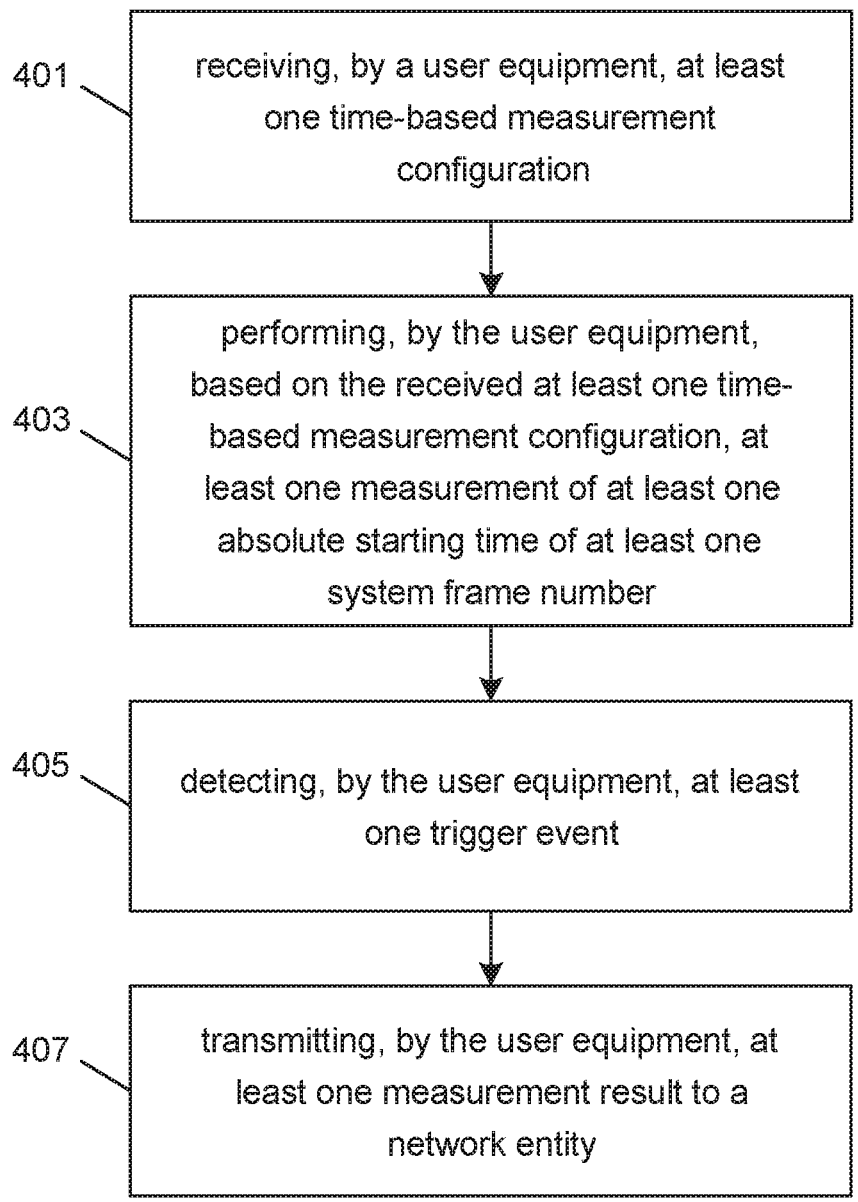
FIG. 4 illustrates an example of another method performed by a user equipment according to certain embodiments.

FIG. 4 illustrates an example of a method performed by a user equipment, such as user equipment 520 illustrated in FIG. 5, according to certain embodiments. In step 401, the UE may receive at least one time-based measurement configuration. The at least one time-based measurement configuration may be based on time rather than signal power levels. As discussed above, propagation delay and loss may be equal for $sl_1$ and $sl_2$, shown in FIG. 1. The transparent satellite amplify-and-forward functionality may cause the UE to be unaware of the propagation loss on $fl_1$ and $fl_2$, but may be affected by the propagation delay of $fl_1$ and $fl_2$. The at least one time-based measurement configuration may be based on at least one system time received from a serving cell NE and a target cell NE. In some embodiments, the at least one time-based measurement configuration may comprise at least one offset value, such as $t_{SFN-Offset}$.

In a variant, the at least one time-based measurement configuration may be configured to configure the user equipment to measure at least one absolute starting time of at least one given system frame number associated with the first network entity as observed by the user equipment, which may be denoted as $t_{SFN-gNB,1}$, and/or at least one absolute starting time of at least one given system frame number associated with a second network entity as observed by the user equipment, which may be denoted as $t_{SFN-gNB,2}$.

In a variant, the at least one time-based measurement configuration may be configured to configure the user equipment to measure at least one timing advance towards at least one connection associated with the first network entity and/or at least one connection associated with a second network entity.

In a variant, the at least one time-based measurement configuration may be configured to configure the user equipment to perform at least one timing measurement associated with the coordinated universal time (UTC) time information of at least one system information block 9 (SIB9) associated with the first network entity and/or a second network entity.

In step 403, the UE may perform at least one measurement of at least one starting time of at least one SFN. In certain embodiments, the serving cell NE and the target cell NE may be time-synchronized. As a result, the UE may determine at least one timing difference by comparing the known timing of the serving cell NE and measurements of the SSB of the target cell NE. For example, the SSB may contain the primary SS and secondary SS, enabling the UE to determine time-frequency synchronization, and/or at least one PBC, which may comprise at least one MIB containing at least one SFN. In some embodiments, the UE may measure the absolute starting time of a given SFN for the serving cell NE and the target cell NE, indicated as $t_{SFN-UE,1}$ and $t_{SFN-UE,2}$, respectively. For example, the $t_{SFN}$ may be received from the serving cell NE and the target cell NE according to:

$t_{SFN-gNB,1} = t_{SFN-gNB,2}$,

Where $t_{SFN-gNB,1}$ and $t_{SFN-gNB,2}$ are the absolute time of transmission of a given SFN from the serving cell NE and the target cell NE, respectively. In some embodiments, the difference between $t_{SFN-gNB,1}$ and $t_{SFN-gNB,2}$ may be $t_{SFN-Offset}$. Furthermore, in various embodiments, where $t_{SFN-Offset}=0$, the serving cell NE and the target cell NE may be synchronized. However, where $t_{SFN-Offset} \neq 0$, the serving cell NE and the target cell NE may not be synchronized.

In some embodiments, the SFN from the serving cell NE and the target cell NE may not be equal, but the offset may be known to the network, and may be signalled as part of the measurement configuration and/or may be determined by the UE associated with the measurements. Due to the propagation delays, the SFN may be received at different times by the UE, according to:

$$t_{SFN-UE,1} = t_{SFN-gNB,1} + t_{sl1} + t_{fl,1}$$

$$t_{SFN-UE,2} = t_{SFN-gNB,2} + t_{sl2} + t_{fl,2},$$

where $t_{sl}$ and $t_{fl}$ are service and feeder link delays, respectively.

In certain embodiments, for a transparent satellite, service links may experience at least one delay. The feeder links may not experience delays because the satellite may be closer to one network entity than the other, and thus a shorter propagation distance and shorter delay.

In some embodiments, the serving cell NE and the target cell NE may not be time-synchronized. When not time-synchronized, there may be a constant offset between any 2 pairs of satellites. The offset may be estimated by the serving cell NE, the target cell NE, and/or the UE may be used to calculate at least one timing value.

In step 405, at least one trigger event may be detected by the UE. In step 407, the UE may transmit at least one measurement result to the serving cell NE. The at least one measurement result may comprise at least one measurement event based on the two different times $t_{SFN-UE,1}$ and $t_{SFN-UE,2}$. For example, at least one measurement result may be reported to the serving cell NE when the FTD is larger than a predetermined threshold value $\Delta t$, calculated by:

$$FTD = t_{SFN-UE,1} - t_{SFN-UE,2} + t_{SFN-Offset} > \Delta t.$$

The at least one measurement result may include at least $t_{SFN-UE,1}$ and $t_{SFN-UE,2}$.

In some embodiments, $\Delta t$ may be used as a hysteresis parameter similar to traditional measurement events using signal power levels. Alternatively, $\Delta t$ may be used as a window applied by the serving cell NE to control when other UE may trigger a measurement report, which may be used to trigger a handover.

In certain embodiments, the UE may randomly select $\Delta t$, for example, a uniform or Gaussian distribution of [0–T]. As a result, UE in the satellite coverage of a satellite may trigger at least one event during at least one different point in time, including where at least one propagation delay measurement is the same.

In various embodiments, the UE may be configured for dual connectivity (DC). DC may configure the UE to be connected to the serving cell NE and the target cell NE simultaneously, and may measure at least one timing advance (TA) towards both the serving cell NE and the target cell NE. At least one measurement event may be based on at least one TA timing difference (TATD), calculated as $$TATD = TA_{gNB1} - TA_{gNB2} > \Delta T,$$

where $TA_{gNB1}$ and $TA_{gNB2}$ are the currently applied TA levels towards the serving cell NE and the target cell NE, respectively. Furthermore, the at least one TA may include at least one sl and at least one fl delay. Additionally or alternatively, at least one offset factor $\Delta T$ may be used to account for a delay offset when the serving cell NE and the target cell NE are not synchronized. Furthermore, $\Delta T$ may be specific to NE 230 and NE 240, and may not be specific to UE 250.

In some embodiments, the serving cell NE and the target cell NE may exchange at least one of $TA_{gNB1}$ and $TA_{gNB2}$ over an $X_n$ interface. The exchange of the at least one current TA level may enable the network to determine when to perform at least one handover without obtaining measurements from the UE. Furthermore, the serving cell NE and the target cell NE may be physically separated.

In some embodiments, at least one timing reference may be used for the at least one measurement, and may be obtained from other system information than the reception of the SFN in the broadcast channel. For example, in 5G NR, at least one SIB9 message may comprise at least one absolute time reference, and may be used to estimate PHY latency between the serving cell NE and the target cell NE.

FIG. 5 illustrates an example of a system according to certain embodiments. In one embodiment, a system may include multiple devices, such as, for example, network entity 510, user equipment 520, and/or satellite 530.

Network entity 510 may be one or more of a base station, such as an evolved node B (eNB) or 5G or New Radio node B (gNB), a serving gateway, a server, and/or any other access node or combination thereof. Network entity 510 may also be similar to user equipment 520. Furthermore, network entity 510 and/or user equipment 520 may be one or more of a citizens broadband radio service device (CBSD).

User equipment 520 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Satellite 530 may be similar to a low-earth orbit or geostationary earth orbit satellite.

One or more of these devices may include at least one processor, respectively indicated as 511, 521, and 531. Processors 511, 521, and 531 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of devices indicated at 511, 521, and 531. The memory may be fixed or removable. The memory may include computer program instructions or computer code contained therein. Memories 512, 522, and 532 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language. Memory may be removable or non-removable.

Processors 511, 521, and 531 and memories 512, 522, and 532 or a subset thereof, may be configured to provide means corresponding to the various blocks of FIGS. 1-4. Although not shown, the devices may also include positioning hardware, such as GPS or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 5, transceivers 513, 523, and 533 may be provided, and one or more devices may also include at least one antenna, respectively illustrated as 514, 524, and 534. The device may have many antennas, such as an array of antennas configured for multiple input multiple output (MIMO) communications, or multiple antennas for multiple radio access technologies. Other configurations of these devices, for example, may be provided. Transceivers 513, 523, and 533 may be a transmitter, a receiver, or both a transmitter and a receiver, or a unit or device that may be configured both for transmission and reception.

The memory and the computer program instructions may be configured, with the processor for the particular device, to cause a hardware apparatus such as user equipment to perform any of the processes described below (see, for example, FIGS. 1-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 1-4. For example, circuitry may be hardware-only circuit implementations, such as analog and/or digital circuitry. In another example, circuitry may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

3GPP 3rd Generation Partnership Project
DC Dual Connectivity
eMBB Enhanced Mobile Broadband
eNB Evolved Node B
EPC Evolved Packet Core
FTD Frame Time Difference
gNB Next Generation eNB
GPS Global Positioning System
GS Ground Station
LTE Long-Term Evolution
MCS Modulation and Coding Scheme
MME Mobility Management Entity
MTC Machine-Type Communications
NR New Radio
OTDOA Observed Time Difference Of Arrival
RAN Radio Access Network
RSRP Reference Signal Received Power
SIB System Information Block
SFN System Frame Number
SFTD System Frame Timing Difference
SSB Synchronization Signal Block
TA Timing Advance
TATD Timing Advance Timing Difference
UTC Coordinated Universal Time
UE User Equipment
UL Uplink
URLLC Ultra-Reliable and Low-Latency Communication
WLAN Wireless Local Area Network

We claim:

1. An apparatus, comprising:
   at least one processor; and
   at least one memory including computer program code;
   the at least one memory and the computer program code configured to, with the at least one processor, cause the apparatus at least to:
   receive at least one time-based measurement configuration, wherein the at least one time-based measurement result is received by the apparatus when a time difference measured by a user equipment exceeds or does not exceed a predetermined threshold, and wherein the at least one measurement result includes at least a first absolute starting time of a first system frame number, at least a first absolute starting time of a second system frame number, and at least one offset value;
   wherein the at least one time-based measurement configuration is configured to cause the apparatus to measure:
   at least one timing measurement of at least one absolute starting time of a system frame number associated with one or more of a first network entity and a second network entity, wherein the system frame number from one or more of the first network entity and a second network entity is not equal, and the offset is signaled as part of the at least one time-based measurement configuration;

at least one timing advance towards at least one connection associated with the first network entity and at least one timing advance towards one connection associated with the second network entity; and at least one timing measurement associated with coordinated universal time (UTC) time information associated with one or more of the first network entity and the second network entity;

perform at least one measurement based on the at least one time-based measurement configuration, wherein performing comprises:

measuring, based on the received at least one time-based measurement configuration, one or more of at least one absolute starting time of at least one given system frame number associated with the first network entity as observed by the apparatus and at least one absolute starting time of at least one given system frame number associated with a second network entity as observed by the apparatus;

measuring, based on the received at least one time-based measurement configuration, one or more of at least one timing advance towards at least one connection associated with the first network entity as observed by the apparatus and at least one timing advance towards at least one connection associated with the second network entity as observed by the apparatus; and measuring, based on the received at least one time-based measurement configuration, one or more of at least one timing measurement associated with the UTC information associated with the first network entity as observed by the apparatus and at least one timing measurement associated with the UTC associated with the second network entity as observed by the apparatus;

detect at least one trigger event associated with reporting at least one measurement result; and transmit at least one measurement result to the first network entity in response to the at least one detected trigger event.

* * * * *